(12) United States Patent
Wang et al.

(10) Patent No.: US 11,924,563 B2
(45) Date of Patent: Mar. 5, 2024

(54) HIGH DYNAMIC RANGE (HDR) PHOTOGRAPHY WITH IN-SENSOR ZOOM

(71) Applicant: QUALCOMM Incorporated, San Diego, CA (US)

(72) Inventors: Jing Wang, Milpitas, CA (US); Xiaoyun Jiang, San Diego, CA (US); Ting-Kuei Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/645,695

(22) Filed: Dec. 22, 2021

(65) Prior Publication Data

US 2023/0199337 A1 Jun. 22, 2023

(51) Int. Cl.
*H04N 25/589* (2023.01)
*G06T 5/00* (2006.01)
*G06T 5/50* (2006.01)

(52) U.S. Cl.
CPC ......... *H04N 25/589* (2023.01); *G06T 3/4015* (2013.01); *G06T 3/4053* (2013.01); *G06T 5/009* (2013.01); *G06T 5/50* (2013.01); *G06T 2207/20208* (2013.01)

(58) Field of Classification Search
None
See application file for complete search history.

(56) References Cited

U.S. PATENT DOCUMENTS

| | | | |
|---|---|---|---|
| 9,179,085 B1* | 11/2015 | Rivard | H04N 25/77 |
| 10,255,888 B2* | 4/2019 | Narasimha | G06T 5/008 |
| 2007/0285526 A1 | 12/2007 | Mann et al. | |
| 2008/0219585 A1 | 9/2008 | Kasai et al. | |
| 2011/0176024 A1 | 7/2011 | Kwon et al. | |
| 2015/0043811 A1* | 2/2015 | Prabhudesai | G06T 5/50 382/164 |
| 2015/0078678 A1 | 3/2015 | Grandin et al. | |
| 2015/0312537 A1 | 10/2015 | Solhusvik et al. | |
| 2016/0080653 A1 | 3/2016 | Kim et al. | |
| 2019/0149721 A1* | 5/2019 | Shabtay | G03B 19/22 348/350 |

FOREIGN PATENT DOCUMENTS

EP 2816527 B1 * 12/2018 ........... G06K 9/6212

OTHER PUBLICATIONS

International Search Report and Written Opinion—PCT/US2022/081184—ISA/EPO—dated Mar. 27, 2023.

* cited by examiner

*Primary Examiner* — James M Hannett
(74) *Attorney, Agent, or Firm* — QUALCOMM Incorporated

(57) ABSTRACT

This disclosure provides systems, methods, and devices for image processing that supports high dynamic range (HDR) photography. In some aspects, a method of generating a full-resolution HDR photograph with in-sensor zoom includes receiving first and second image data corresponding to first and second exposure captures of a scene. First and second full-resolution image frames may be generated from the first and second image data, which are subsequently processed with HDR fusion to obtain an output image frame with higher dynamic range than either the first or second image data. The first full-resolution image frame may be determined from both the first and second image data by compensating the second image data for differences between the first and second exposures. Other aspects and features are also claimed and described.

30 Claims, 8 Drawing Sheets

HIGH DYNAMIC RANGE (HDR) PHOTOGRAPHY WITH IN-SENSOR ZOOM

TECHNICAL FIELD

Aspects of the present disclosure relate generally to image processing. Some features may enable and provide improved image processing, including image with increased image detail and/or dynamic range.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Dynamic range may be important to image quality when capturing a representation of a scene with a wide color gamut using an image capture device. Conventional image sensors have a limited dynamic range, which may be smaller than the dynamic range of human eyes. Dynamic range may refer to the light range between bright portions of an image and dark portions of an image. A conventional image sensor may increase an exposure time to improve detail in dark portions of an image at the expense of saturating bright portions of an image. Alternatively, a conventional image sensor may decrease an exposure time to improve detail in bright portions of an image at the expense of losing detail in dark portions of the image. Thus, image capture devices conventionally balance conflicting desires, preserving detail in bright portions or dark portions of an image, by adjusting exposure time. High dynamic range (HDR) photography improves photography using these conventional image sensors by combining multiple recorded representations of a scene from the image sensor.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

An image sensor may be configured to record image frames with different sensitivities such that the image frames may be combined to produce a photograph with improved quality. The improved quality may be observed through higher detail in dark regions without losing detail in highlight regions. An image sensor according to embodiments of the disclosure with different sensitivities for recording to representations of the scene may be used to produce a standard dynamic range (SDR) photograph or a high dynamic range (HDR) photograph. A method for processing first data and second data captured at least partially in overlapping time periods from one or more sensors may include receiving, from the image sensor or from memory coupled to the image sensor, image data comprising first data and second data.

This disclosure provides systems, methods, and devices for image processing that supports high dynamic range (HDR) photography. In some aspects, a method of generating a full-resolution HDR photograph with in-sensor zoom includes receiving first and second image data corresponding to first and second representation of a scene at first and second exposures, respectively. First and second full-resolution image frames may be generated from the first and second image data, which are subsequently processed with HDR fusion to obtain an output image frame with higher dynamic range than either the first or second image data. The first full-resolution image frame may be determined from both the first and second image data by compensating the second image data for differences between the first and second exposures. Other aspects and features are also claimed and described.

In one aspect of the disclosure, a method for image processing includes receiving an input image frame representing a scene at a first resolution, wherein the input image frame comprises first image data and second image data, the first image data corresponding to a first exposure different from a second exposure of the second image data; determining a first image frame from the first image data and the second image data by adjusting the second image data based on a difference between the first exposure and the second exposure, wherein the first image frame has a same resolution as the first resolution; determining a second image frame from the second image data, wherein the second image frame has a same resolution as the first resolution; and determining an output image frame based on the first image frame and the second image frame.

In an additional aspect of the disclosure, an apparatus includes at least one processor and a memory coupled to the at least one processor. The at least one processor is configured to perform operations including receiving an input image frame representing a scene at a first resolution, wherein the input image frame comprises first image data and second image data, the first image data corresponding to a first exposure different from a second exposure of the second image data; determining a first image frame from the first image data and the second image data by adjusting the second image data based on a difference between the first exposure and the second exposure, wherein the first image frame has a same resolution as the first resolution; determining a second image frame from the second image data, wherein the second image frame has a same resolution as the first resolution; and determining an output image frame based on the first image frame and the second image frame.

In an additional aspect of the disclosure, an apparatus includes means for receiving an input image frame representing a scene at a first resolution, wherein the input image frame comprises first image data and second image data, the first image data corresponding to a first exposure different from a second exposure of the second image data; means for determining a first image frame from the first image data and the second image data by adjusting the second image data based on a difference between the first exposure and the second exposure, wherein the first image frame has a same resolution as the first resolution; means for determining a second image frame from the second image data, wherein the second image frame has a same resolution as the first resolution; and means for determining an output image frame based on the first image frame and the second image frame.

In an additional aspect of the disclosure, a non-transitory computer-readable medium stores instructions that, when executed by a processor, cause the processor to perform operations. The operations include receiving an input image frame representing a scene at a first resolution, wherein the input image frame comprises first image data and second image data, the first image data corresponding to a first exposure different from a second exposure of the second image data; determining a first image frame from the first image data and the second image data by adjusting the second image data based on a difference between the first exposure and the second exposure, wherein the first image frame has a same resolution as the first resolution; determining a second image frame from the second image data, wherein the second image frame has a same resolution as the first resolution; and determining an output image frame based on the first image frame and the second image frame.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
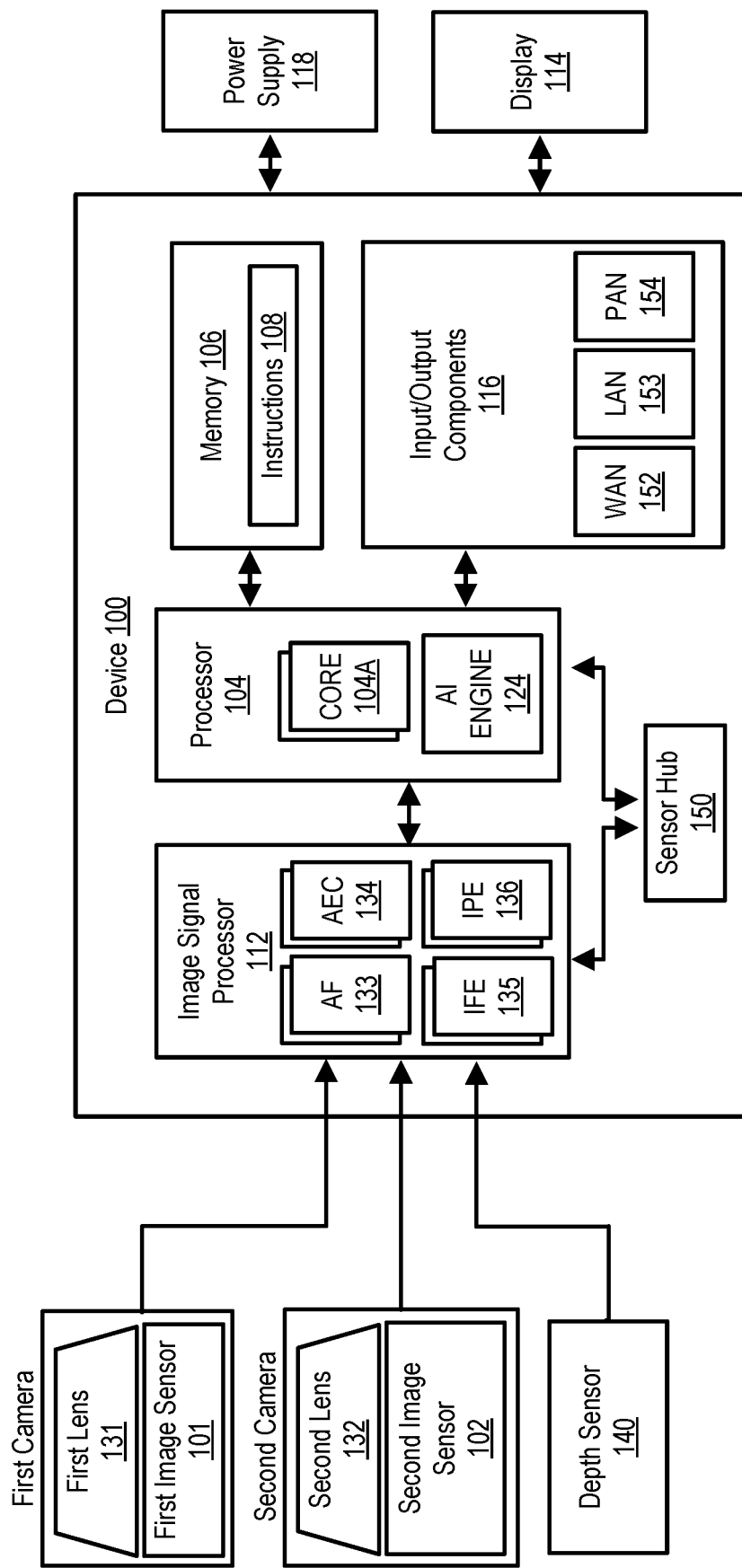
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Recording high dynamic range (HDR) photographs with an image capture device uses two or more exposures at different exposures to capture detail in a variety of shadow and highlight regions. In some configurations, HDR photographs can be captured simultaneously from a single image sensor by controlling different groups of pixels within the image sensor to capture different exposures of the scene, such as by controlling groups of pixels to capture different exposure lengths. One benefit of the simultaneous capture of different exposures is reduced motion blur that could result when recording exposures sequentially in time. However, the simultaneous capture of different exposures results in each exposure having a resolution that is a fraction of the full-resolution of the image sensor.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

The present disclosure provides systems, apparatus, methods, and computer-readable media that support image capture and/or image processing. For example, the image processing may be performed to obtain high dynamic range images with in-sensor zoom applied. The HDR photography may be obtained using a pixel-interleaved image sensor, which obtains two simultaneous exposures of a scene at different exposure times. Simultaneous exposures may refer to two exposures obtained in at least partially overlapping time periods, such as when the two exposures start at the same time but end at different times. In some embodiments, the pixel-interleaved image sensor may have different characteristics between groups of sensor elements to achieve different equivalent exposure times, in addition to or in the alternative to different actual exposure times. The processing may include separating data corresponding to two different exposures and upscaling the first data and second data corresponding to the two different exposures to obtain two corresponding full-resolution images that can be processed through HDR fusion to obtain the HDR photograph. The upscaling of one of the image frames may include forming an image frame based on the first data from one exposure with second data from another exposure that is exposure-compensated to obtain a full-resolution image.

Particular implementations of the subject matter described in this disclosure may be implemented to realize one or more of the following potential advantages or benefits. In some aspects, the present disclosure provides techniques for achieving high dynamic range (HDR) photography with in-sensor zoom operation. The image processing using data from, for example, a pixel-interleaved sensor may have more detail than a lower-resolution photograph or a conventional upscaled photography. The image processing may be applied to data received from image sensors of a variety of color patterns, such as QCFA, CFA, or RGB. Some of the image data received from the image sensor may be processed at lower resolution, which reduces power consumption and reduces bandwidth consumption for part of the image processing. In some embodiments, exposure compensation may be performed to obtain a pseudo-full frame long exposure, which can further increase details in non-highlight regions.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. One or more of the image sensors may include a reconfigurable binning module. Additionally or alternatively, one or more of the image signal processors (ISPs) may include a reconfigurable binning module. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is a IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure compensation (AEC) 134 engines. The AF 133, AEC 134, AFE 135, APE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including binning operations. For example, execution of the instructions can instruct the image signal processor 112 to begin or end capturing an image frame or a sequence of image frames, in which the capture includes binning as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands to specify an output dynamic range) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
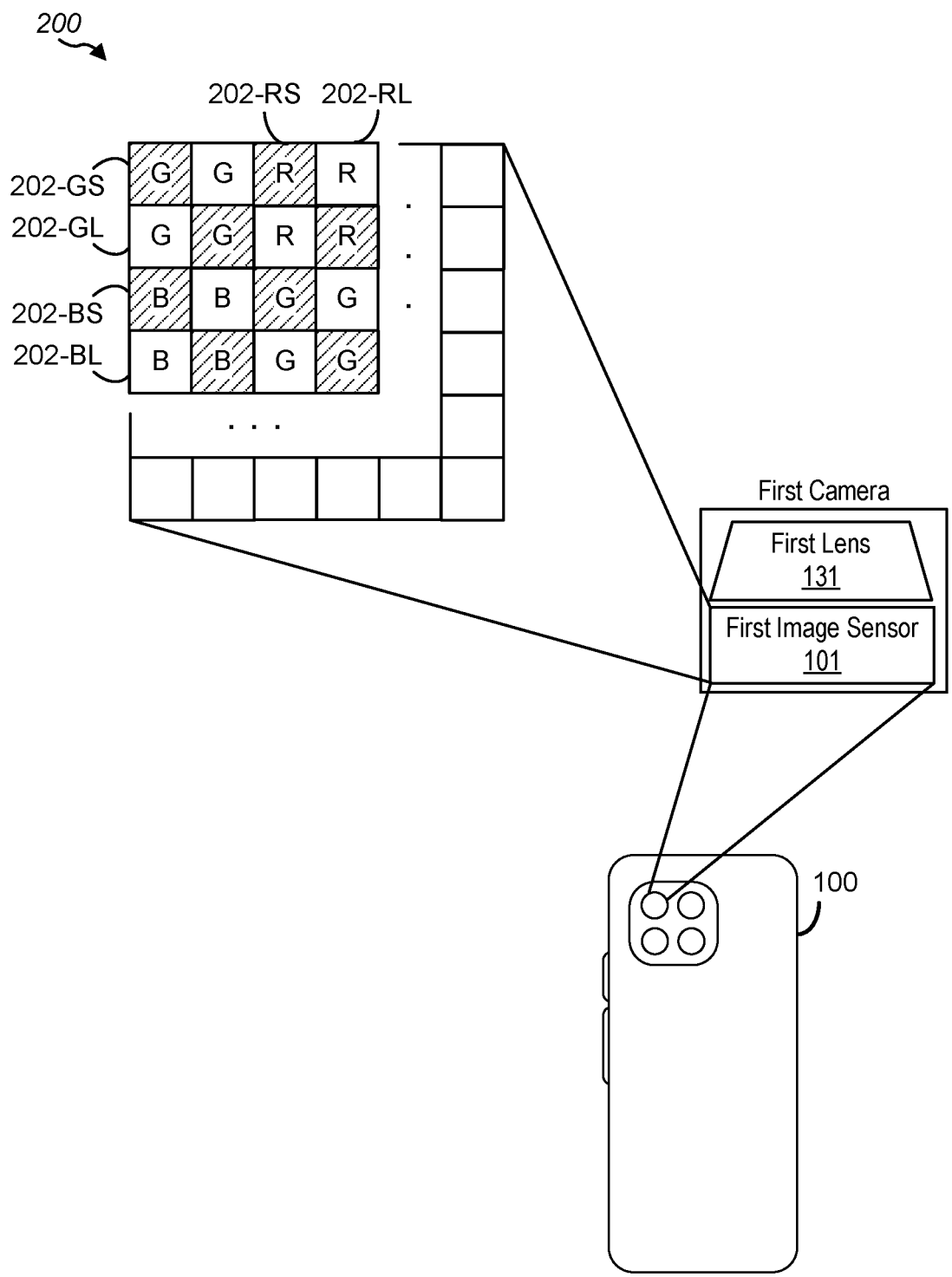
FIG. 2 shows an image capture device with an image sensor configured with a color filter array (CFA) color pattern according to some embodiments of the disclosure.

FIG. 2 shows an image capture device with an image sensor configured with a color filter array (CFA) color pattern according to some embodiments of the disclosure. An image capture device 100 may have one or more cameras, including a first camera with a first image sensor 101. Light reflected by a scene is represented by photons collated by the first lens 131 and directed to the first image sensor 101. The first image sensor 101 includes sensor elements that convert light, represented by photons, into electrical signals. Example sensor elements include charge-coupled devices (CCDs) and active-pixel devices (e.g., complimentary metal-oxide-semiconductor (CMOS) devices). The first image sensor 101 may include an array of many of these sensor elements. Separate colors in a scene may be detected by including a color filter over each of the sensor elements, such that each sensor element measures an intensity of a particular color at a particular location in the scene. The sensor elements and color filters may be organized into a particular cell size that is repeated across a larger size array. Each of the sensor elements may be part of an array 200 of sensor elements. The sensor array 200 may have groups of sensor elements that collectively form a color filter array (CFA) pattern, such as a quarter color filter array (QCFA), a 2×2 CFA, a 3×3 CFA, a 4×4 CFA, a 5×5 CFA, or more generically a N×N CFA, or another color pattern such as a RGBW pattern.

Sensor elements within the array 200 may be differently configured to obtain different representations of a scene at different exposures, such as by configuring a first portion of the sensor elements to capture photos for a first exposure time and configuring a second portion of the sensor elements to capture photos for a second exposure time different from the first exposure time. For example, array 200 may include sensor elements 202-GS configured to capture a value corresponding to green at a shorter exposure time and sensor elements 202-GL configured to capture a value corresponding to green at a longer exposure time. The configuration of sensor elements 202-GS and 202-GL may be repeated for additional colors or additional sensor elements of a color pattern repeated throughout the array 200. For example, array 200 may include sensor elements 202-RS configured to capture a value corresponding to red at a shorter exposure time and sensor elements 202-RL configured to capture a value corresponding to red at a longer exposure time. As another example, array 200 may include sensor elements 202-BS configured to capture a value corresponding to blue at a shorter exposure time and sensor elements 202-BL configured to capture a value corresponding to blue at a longer exposure time.

Image data may be captured from the array 200 as a single image frame represented, for example, as an array of values read-out from the array 200 for a simultaneous capture of a representations of a scene at two or more exposure lengths. The single image frame may include first image data, corresponding to read-out values from 202-GL, 202-RL, and 202-BL, and second image data, corresponding to read-out values from 202-GS, 202-RS, and 202-BS. The input image frame may be processed to obtain a high dynamic range (HDR) photograph with in-sensor zoom as shown in FIG. 3.

Figure 3:
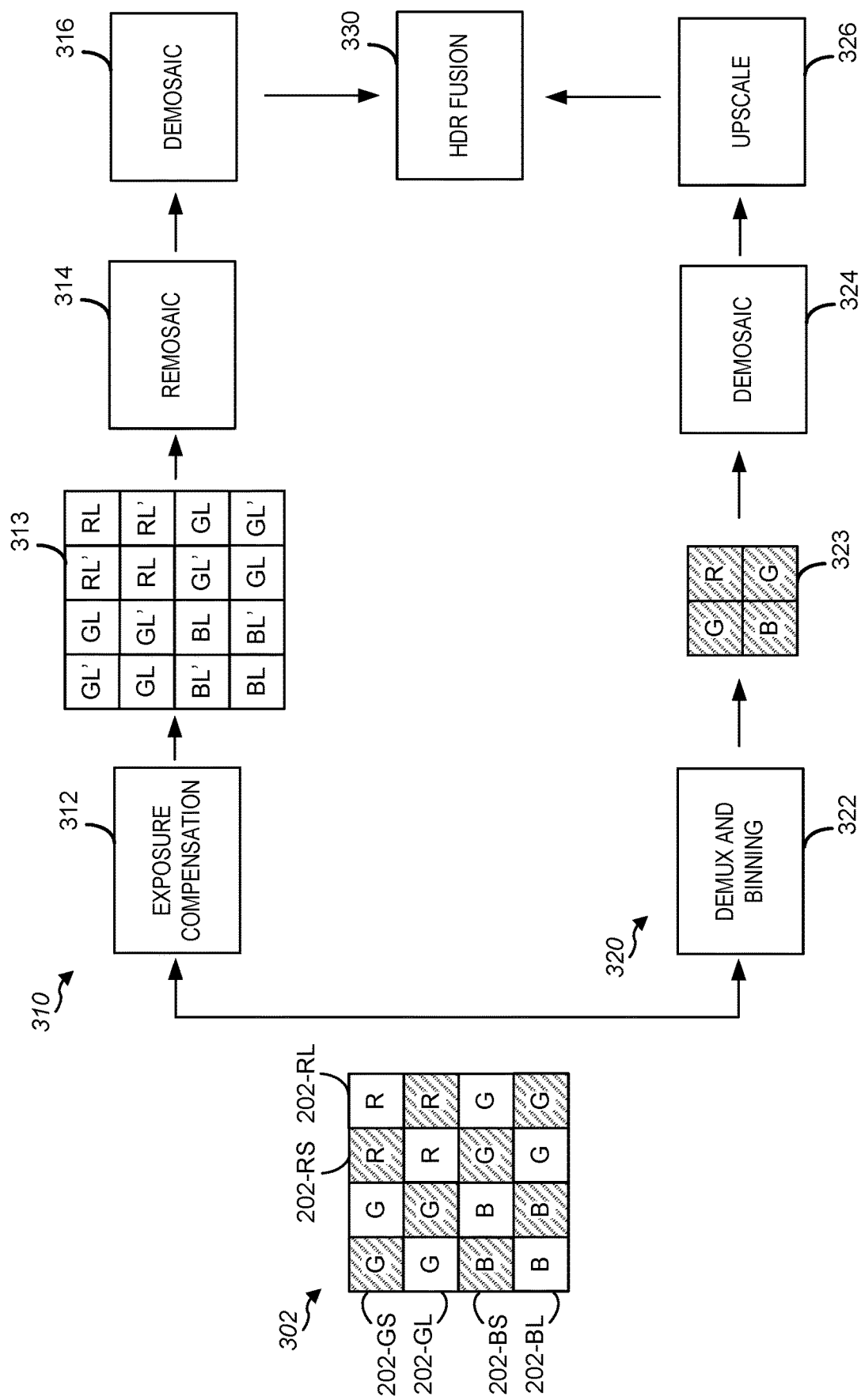
FIG. 3 is a block diagram illustrating processing of an input image frame for high dynamic range (HDR) photography with in-sensor zoom according to some embodiments of the disclosure.

FIG. 3 is a block diagram illustrating processing of an input image frame for high dynamic range (HDR) photography with in-sensor zoom according to some embodiments of the disclosure. An input image frame 302 may be processed in processing paths 310 and 320 to obtain an output image frame with higher dynamic range than either of the first image data or the second image data alone. The output HDR image frame may have a resolution that matches the resolution of the input image frame, despite the representations of the scene corresponding to the first data and the second data each being only a portion of the full resolution of the input image frame. The HDR photograph may be produced from a HDR fusion block 330 based on a first image frame output from a first processing path 310 and based on a second image frame output from a second processing path 320.

The first processing path 310 may produce a first image frame based on a combination of the first data and the second data. Exposure compensation block 312 may generate image frame 313 based on exposure compensating the second data short exposure values 202-GS, 202-RS, and 202-BS to obtain values GL', RL', and BS' that match long exposure values 202-GL, 202-RL, and 202-BL of the first image data. The compensating of the short exposure values may include adjusting the second image data based on a ratio, or some other calculation, of the first exposure time and the second exposure time. The output of the exposure compensation block 312 is an exposure-compensated image frame 313 that is a full-resolution representation of the scene at a long exposure time. The color pattern of exposure-compensated image frame 313 may correspond to the color pattern of the input image frame 302, such that the image frame 313 is a QCFA representation when the input image frame 302 is a QCFA representation. The exposure-compensated image frame 313 may be processed in remosaic block 314 to produce a full-resolution Bayer representation of the scene, which is subsequently processed in demosaic block 316 to produce a full-resolution RGB representation of the scene as the first image frame for processing in HDR fusion block 330.

The second processing path 320 may produce a second image frame based on the second data. A demultiplexing and binning block 322 may process the input image frame 302 to separate second image data corresponding to the short exposure representation and bin the second image data to produce image frame 323 that is a lower resolution than the input image frame 302. For example, image frame 323 may be a quarter-resolution QCFA representation when the input image frame 302 is a QCFA representation. The image frame 323 is processed in a demosaic block 324 to produce a quarter-resolution RGB representation of the scene, which is subsequently processed in upscaling block 326 to produce a full-resolution RGB representation of the scene, which matches a resolution of the input image frame 302 and the first image frame produced by the first processing path 310 at the output of the demosaic block 316. The full-resolution RGB representation is input to HDR fusion block 330 as a second image frame.

HDR fusion block 330 may receive two full-resolution image frames and produce an output image frame with higher dynamic range than either of the received two full-resolution image frames. The HDR fusion block 330 may receive full-resolution image frames from processing path 310 and processing path 320 to produce a full-resolution output image frame that matches a resolution of the input image frame 302. Zoom applied in the image sensor when capturing the input image frame 302 is carried through the processing in processing paths 310 and 320, such that the HDR output image frame from HDR fusion block 330 reflects the same in-sensor zoom of the input image frame 302.

The dynamic range and/or quality of the output image frame from HDR fusion block 330 may be improved with additional representations of the scene captured at different exposures. An example of processing involving three exposure lengths is shown in FIG. 4.

Figure 4:
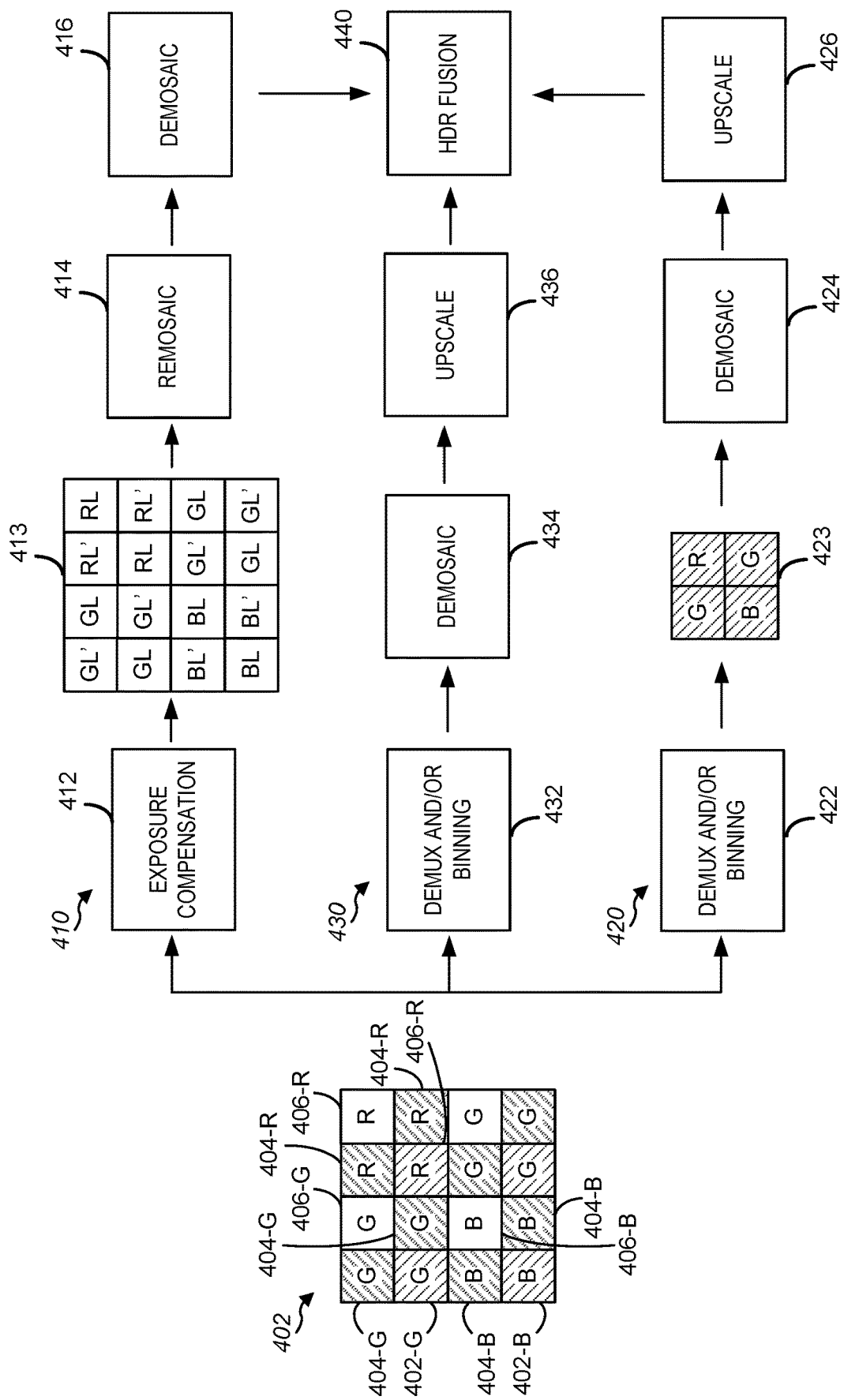
FIG. 4 is a block diagram illustrating processing of an input image frame for high dynamic range (HDR) photography with three exposure lengths according to some embodiments of the disclosure.

FIG. 4 is a block diagram illustrating processing of an input image frame for high dynamic range (HDR) photography with three exposure lengths according to some embodiments of the disclosure. An input image frame 402 may include first image data corresponding to a first long exposure length, second image data corresponding to a second short exposure length, and third image data corresponding to a third middle exposure length. The first image data 406 may include green values 406-G, red values 406-R, and blue values 406-B. The second image data 402 may include green values 402-G, red values 402-R, and blue values 402-B. The third image data 404 may include green values 404-G, red values 404-R, and blue values 404-B. Processing paths 410, 420, and 430 may produce three full-resolution image frames for input to HDR fusion block 440, which determines an output image frame based on the three full-resolution image frames.

The first processing path 410 may process the at least two of the first, second, and third image data in exposure compensation block 412. The exposure compensation block may produce a full-resolution exposure-compensated image frame 413 with the first image data (e.g., GL, RL, and BL values) and exposure-compensated image data (e.g., GL', RL', and BL' values). The exposure-compensated image data may be determined based on the first image data and the second image data, or based on the first image data and the third image data, or based on the first image data, the second image data, and the third image data. The exposure-compensated image frame 413 may have a color pattern corresponding to that of the input image frame 402. The exposure-compensated image frame 413 may be processed in remosaic block 414 to produce a full-resolution Bayer representation of the scene, which is processed in demo saic block 416 to produce a full-resolution RGB representation of the scene as a first image frame for input to the HDR fusion block 440.

The second processing path 420 may process the second image data in demultiplexing and/or binning block 422 to select the second image data from the input image frame 402, and optionally also bin the second image data to reduce the resolution of the second image data. An image frame output from the block 422 may be a lower-resolution image frame 423 than the input image frame 402, such as a quarter-resolution Bayer representation of the scene. The quarter-resolution Bayer representation may be processed in demosaic block 424 to obtain a quarter-resolution RGB representation of the scene, which is processed in upscaling block 426 to produce a second full-resolution image frame for input to the HDR fusion block 440.

The third processing path 430 may process the third image data in demultiplexing and/or binning block 432 to select the third image data from the input image frame 402, and optionally also bin the third image data to reduce the resolution of the third image data. An image frame output from the block 432 may be a lower-resolution image frame than the input image frame 402, such as a quarter-resolution Bayer representation of the scene. The quarter-resolution Bayer representation may be processed in demosaic block 434 to obtain a quarter-resolution RGB representation, which is processed in upscaling block 436 to produce a third full-resolution image frame for input to the HDR fusion block 440.

Figure 5:
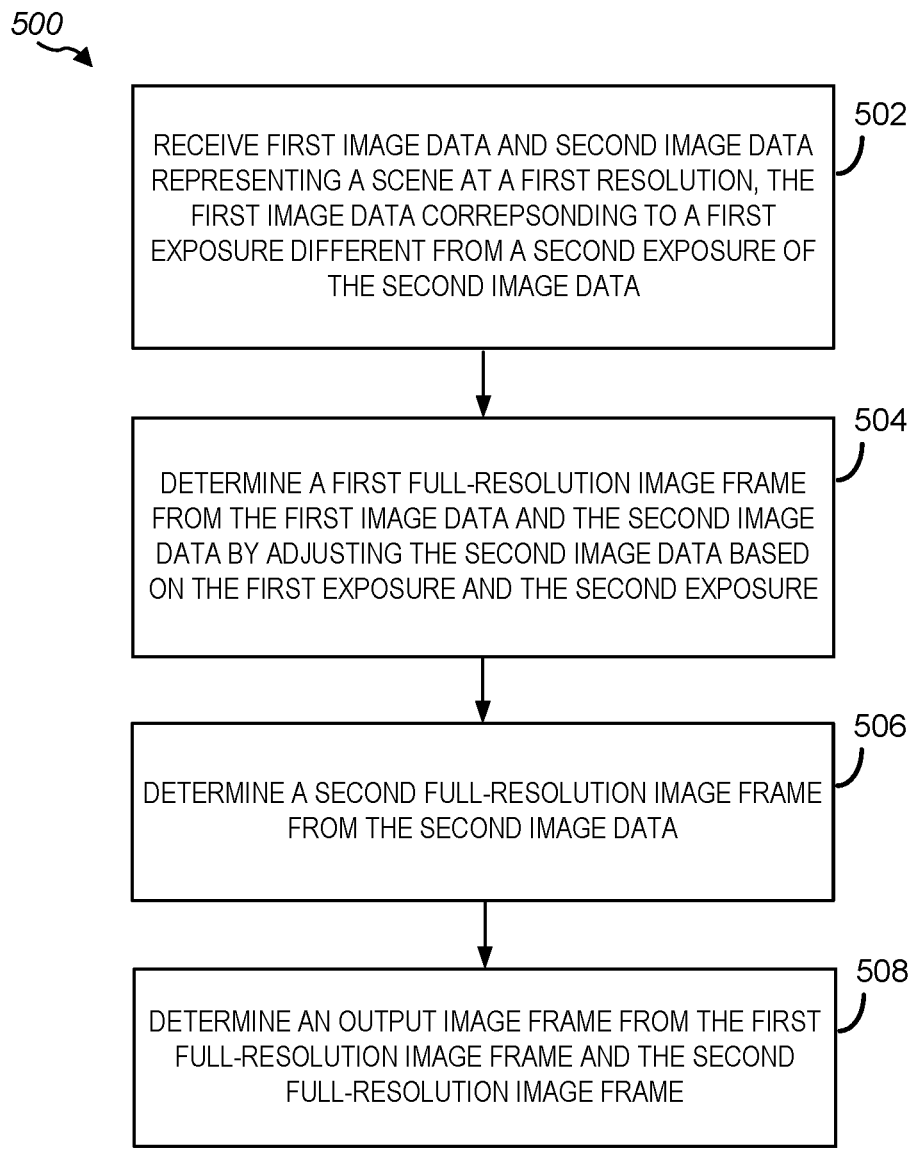
FIG. 5 is a flow chart illustrating a method for HDR photography supporting full-resolution HDR with in-sensor zoom according to some embodiments of the disclosure.

A method for processing image data received from an image sensor, which may be performed, for example, in a processor, image signal processor, or other processing device is shown in FIG. 5. FIG. 5 is a flow chart illustrating a method for HDR photography supporting full-resolution HDR with in-sensor zoom according to some embodiments of the disclosure. A method 500 includes receiving an input image frame at block 502. The input image frame may include first image data and second image data, the image data representing a scene at a first resolution, which may be a maximum resolution of the image sensor generating the input image frame. The first image data may be data captured by the image sensor corresponding to a first exposure, and the second image data may be data captured by the image sensor corresponding to a second exposure. The different exposures may be a result of different exposure times or other configurations that generate different representations of a scene. For example, the different exposures may be a result of different pixel sizes such that more light is captured in a same time period.

At block 504, a first full-resolution image frame is determined from the first image data and the second image data. The first and/or second image data may be compensated to create an image frame corresponding to the full resolution of the image sensor, despite both the first image data and the second image data representing only a fraction of the full resolution of the image sensor. The compensation may be based on the first image data and/or the second image data. For example, the second image data, corresponding to a shorter exposure time, may be compensated based on a ratio of a first exposure time corresponding to the first image data and a second exposure time corresponding to the second image data. In some embodiments, the first image frame may be a pseudo-long exposure frame.

At block 506, a second full-resolution image frame is determined from either the first image data or the second image data. The full-resolution image frame may be determined by processing first or second image data at a lower-resolution, which is lower than the full-resolution of the image sensor or the input image frame received from the image sensor. The processing may include, for example, demultiplexing to separate and select only one of the first image data and the second image data, binning to reduce the resolution or either the first or second image data, and/or remosaicing or demosaicing to change a color pattern of the image data to a different color pattern. The processed first or second image data may be upscaled to the full-resolution size to facilitate combination with the first full-resolution image frame determined at block 504.

At block 508, an output image frame is determined from the first full-resolution image frame determined at block 504 and the second full-resolution image frame determined at block 506. The output image frame may be determined, for example, by an HDR fusion process that selects and/or combines pixels from the first full-resolution image frame with pixels from the second full-resolution image frame. The output of the HDR fusion process is an output image frame with higher dynamic range that either the first image data or the second image data. For example, the HDR fusion may keep detailed portions of a highlight region of a low exposure representation and replace shadow regions of the low exposure representation with details from portions of a high exposure representation. The HDR fusion process may also include additional processing, such as tone mapping.

The method of image processing described in FIG. 5 and in embodiments of this disclosure may be applied to image frames acquired from image sensors with a variety of color pattern configurations for the sensor elements. For example, embodiments of the image processing of FIG. 5 described with reference to FIG. 3 and FIG. 4 may be applied to input image frames with quarter color filter array (QCFA) color patterns. Embodiments of the method may also be applied to 4×4 CFA color patterns as shown in FIG. 6.

Figure 6:
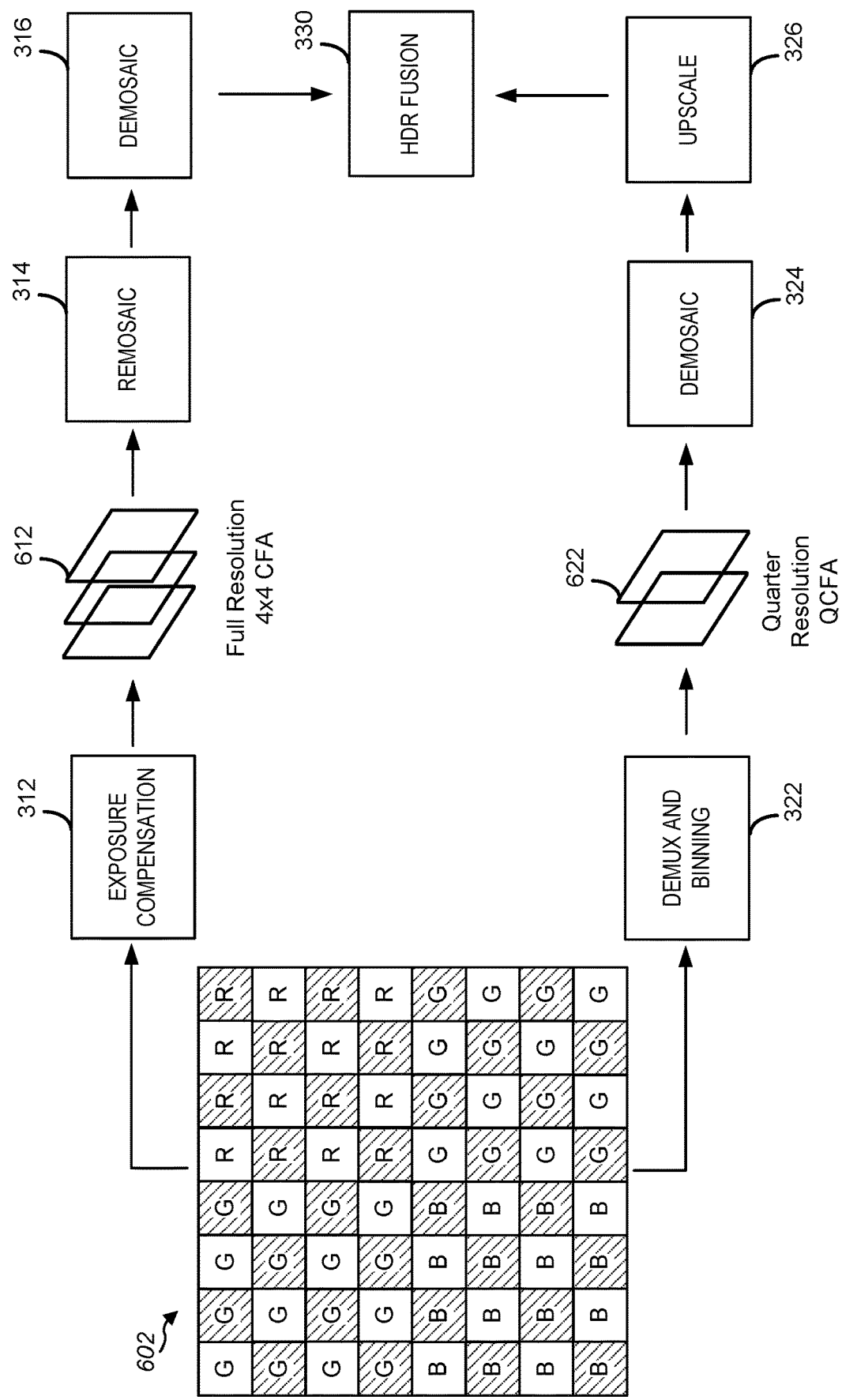
FIG. 6 is a block diagram illustrating processing of an input image frame with a 4×4 CFA color pattern for high dynamic range (HDR) photography according to some embodiments of the disclosure.

FIG. 6 is a block diagram illustrating processing of an input image frame with a 4×4 CFA color pattern for high dynamic range (HDR) photography according to some embodiments of the disclosure. An input image frame 602 may be processed with exposure compensation block 312 to generate a full-resolution exposure-compensated CFA image frame 612 based on the first image data and the second image data in input image frame 602, such as by combining first image data with exposure-compensated second image data. The full-resolution CFA image frame 612 may be further processed in remosaic block 314 to produce a full-resolution Bayer pattern image frame and in demosaic block 316 to produce a first full-resolution RGB image frame. The input image frame 602 may also be processed with block 322 to demultiplex and/or bin the second image data to produce a lower resolution (e.g., quarter resolution) QCFA image frame 612. The image frame 612 may be further processed in demosaic block 324 to produce a quarter-resolution RGB image frame and in upscaling block 326 to produce a second full-resolution RGB image frame. The first image frame output from demosaic block 316 and the second image frame output from the upscaling block 326 may be processed in HDR fusion block 330 to produce an output image frame for HDR photography.

Figure 7:
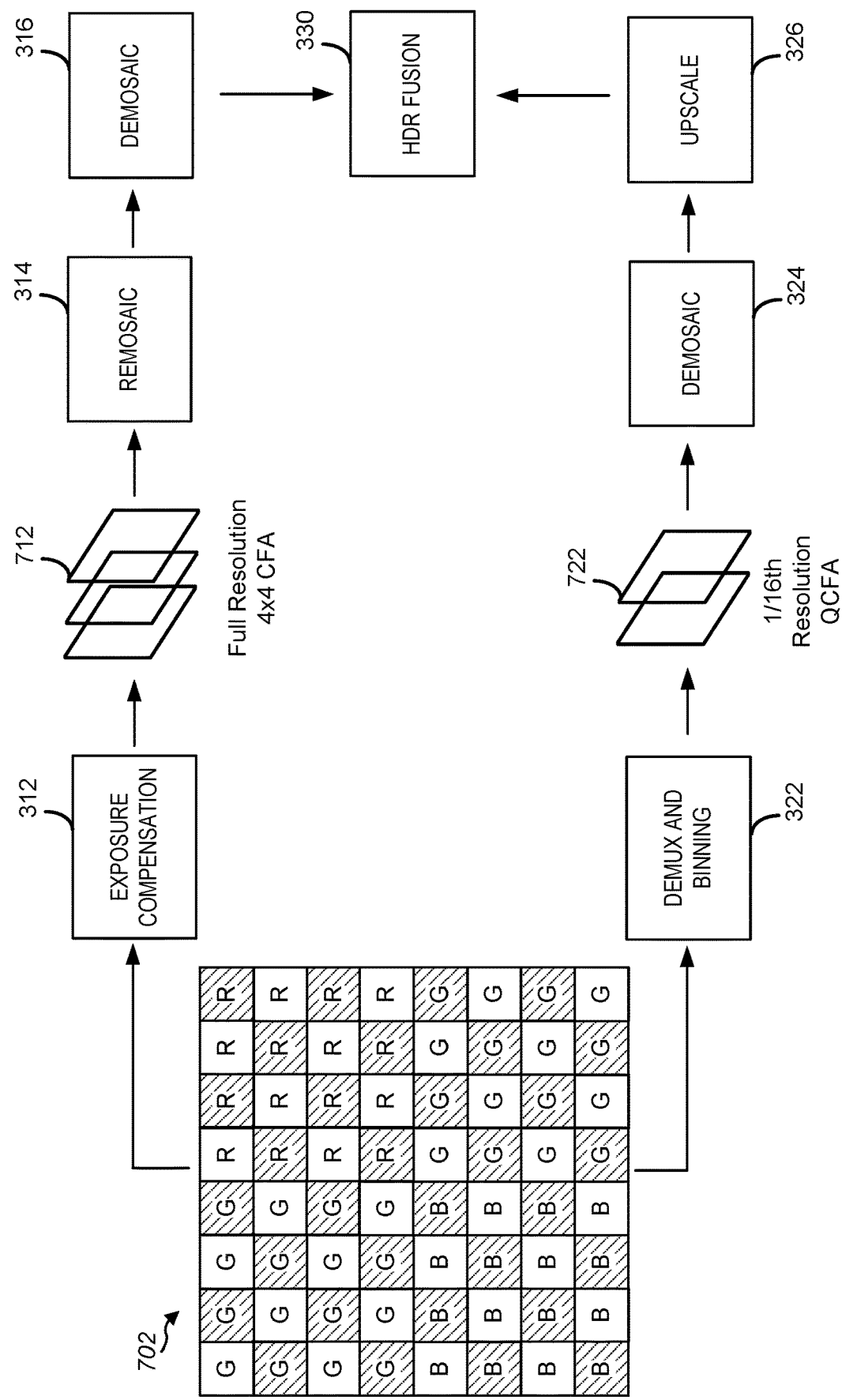
FIG. 7 is a block diagram illustrating processing of an input image frame with a 4×4 CFA color pattern and ¹/₁₆th scaling for high dynamic range (HDR) photography according to some embodiments of the disclosure.

As another example, embodiments of the method described herein, such as in FIG. 3, FIG. 4, and FIG. 5, may also be applied to 4×4 CFA color patterns using different scaling in the processing paths as shown in FIG. 7. In FIG. 6, the lower-resolution image frame 622 is obtained through binning that reduces the full-resolution of input image frame 602 to one-quarter of the full-resolution. Other integer ratios for the lower-resolution processing may be used. For example, FIG. 7 is a block diagram illustrating processing of an input image frame with a 4×4 CFA color pattern and ¹⁄₁₆th scaling for high dynamic range (HDR) photography according to some embodiments of the disclosure.

An input image frame 702 may be processed with exposure compensation block 312 to generate a full-resolution 4×4 CFA image frame 712 based on the first image data and the second image data in input image frame 702, such as by combining first image data with exposure-compensated second image data. The full-resolution 4×4 CFA image frame 712 may be further processed in remosaic block 314 to produce a full-resolution Bayer pattern image frame and in demosaic block 316 to produce a first full-resolution RGB image frame. The input image frame 702 may also be processed with block 322 to demultiplex and bin the second image data to produce a lower resolution (e.g., ¹⁄₁₆ resolution) QCFA image frame 722. The image frame 722 may be further processed in demosaic block 324 to produce a ¹⁄₁₆th resolution RGB image frame and in upscaling block 326 to produce a second full-resolution RGB image frame. The first image frame output from demosaic block 316 and the second image frame output from the upscaling block 326 may be processed in HDR fusion block 330 to produce an output image frame for HDR photography.

Although 4×4 CFAs are shown in the example embodiments of FIG. 6 and FIG. 7, other CFA color patterns may be processed in a similar manner according to aspects of the embodiments of FIG. 3, FIG. 4, FIG. 5, FIG. 6, and/or FIG. 7. For example, an input image frame received in a 3×3 CFA color pattern may be processed in a manner similar to that shown in FIG. 7. In one such embodiment, the exposure compensation block 312 would produce a full-resolution 3×3 CFA image frame, which is processed in remosaic block 314 to produce a full-resolution Bayer pattern image frame, and in demosaic block 316 to produce a full-resolution RGB image frame. Likewise, the block 322 would be configured to produce a ⅓rd resolution QCFA or a ⅑th resolution QCFA from the input 3×3 CFA input image frame, which is processed in demosaic block 324 to produce a ⅓- or ⅑-resolution RGB pattern image frame that is input to upscaling block 326 to produce a full-resolution RGB image frame.

Further, although several example embodiments are described as processing representations of a scene in a N×N CFA color pattern, the processing described herein may be applied to other color patterns. For example, an input image frame received in a RGBW color pattern may be processed in a manner similar to that shown in FIG. 7. In one such embodiment, the exposure compensation block 312 would produce a full-resolution QCFA image frame, which is processed in remosaic block 314 to produce a full-resolution Bayer pattern image frame, and in demosaic block 316 to produce a full-resolution RGB image frame. Likewise, the block 322 would be configured to produce a quarter-resolution Bayer pattern image frame, which is processed in demosaic block 324 to produce a quarter-resolution RGB image frame that is input to upscaling block 326 to produce a full-resolution RGB image frame.

Figure 8:
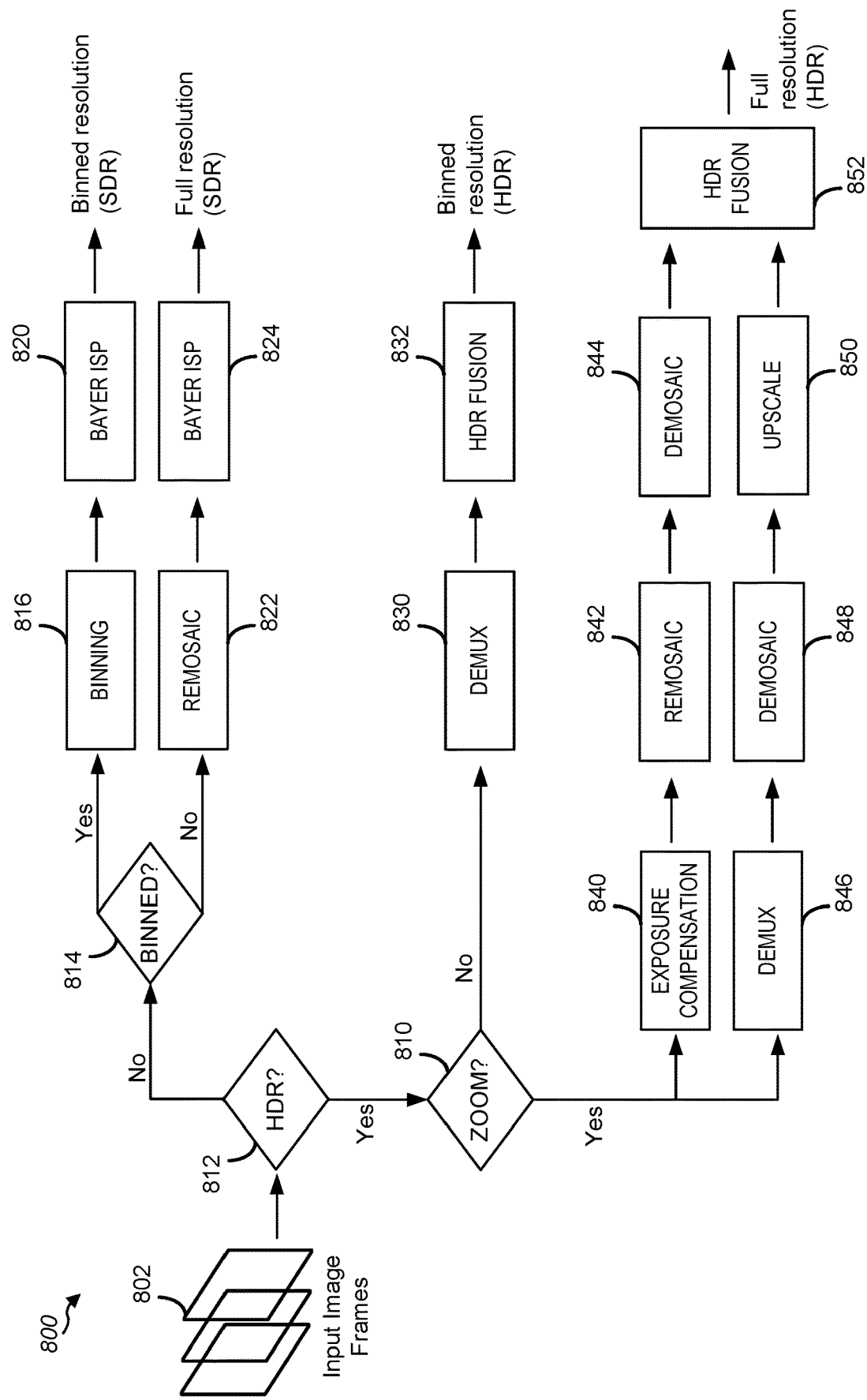
FIG. 8 is a block diagram illustrating different processing algorithms for which a processor can be reconfigured according to some embodiments of the disclosure.

The HDR processing described in embodiments of this disclosure may be used in combination with other image processing techniques to produce output image frames in different configurations based on user settings or scene conditions. FIG. 8 is a block diagram illustrating different processing algorithms for which a processor can be reconfigured according to some embodiments of the disclosure. A processing flow 800 operates on a series of input image frames 802. The processing may proceed differently for each image frame of the input image frames 802, or groups of input image frames may be processed in like manners.

Processing of the input image frames 802 includes determining at block 812 whether HDR photography is enabled, such as through a setting in a camera application operated by a user. For example, the user may specify in the camera application whether to capture HDR or SDR photography. If HDR photography is not enabled, the processing continues to block 814 to determine whether to output a full-resolution image frame or lower-resolution output image frame by binning. Binning may be configured, for example, by a camera application setting to output a lower resolution (e.g., less megapixels MPa) than a full-resolution of the image sensor generating the input image frames 802. If binning is enabled at block 814, the input image frames 802 are processed in binning block 816 to reduce the resolution, and converted to a Bayer pattern in block 820. The output of block 820 is one or more binned resolution (SDR) image frames. If binning is not enabled at block 814, the input image frames 802 are processed in remosaic block 822 to a QCFA color pattern and converted in block 824 to a Bayer pattern. The output of block 824 is one or more full-resolution (SDR) image frames.

Returning to block 812, if HDR photography is enabled, the processing proceeds to block 810 to determine if in-sensor zoom is active. In-sensor zoom may be specified by a digital zoom setting in the camera application, which may be controlled by a user through a touch screen interface or physical buttons, such as a volume rocker, on the image capture device. If in-sensor zoom is not enabled at block 810, the input image frames 802 are processed through demultiplexer block 830 to produce first and second image data corresponding to two different exposures, which are then processed in HDR fusion block 832 to produce binned resolution (HDR) image frames. Returning to block 810, if in-sensor zoom is active and HDR photography is enabled then the processing of embodiments of this disclosure, such as illustrated in FIG. 3, FIG. 4, FIG. 5, FIG. 6, and/or FIG. 7 may be applied to produce full-resolution (HDR) image frames. A first image processing path of exposure compensation block 840, remosaic block 842, and demosaic block 844 may determine a first full-resolution image frame. A second image processing path of demultiplexer and/or binning block 846, demosaic block 848, and upscaling block 850 may determine a second full-resolution image frame. The first and second full-resolution image frames may be input to HDR fusion block 852 for generating a full resolution (HDR) image frame.

Although generation of a single output image frame is described in the examples herein, the HDR photography techniques described herein may be used to generate a HDR video sequence, such as a series of HDR image frame generated for a sequence of input image frames.

It is noted that one or more blocks (or operations) described with reference to FIG. 5 may be combined with one or more blocks (or operations) described with reference to another of the figures. For example, one or more blocks (or operations) of FIG. 5 may be combined with one or more blocks (or operations) of FIG. 3. As another example, one or more blocks associated with FIG. 5 may be combined with one or more blocks associated with FIG. 4. As another example, one or more blocks associated with FIG. 5 may be combined with one or more blocks (or operations) associated with FIGS. 6-8. Additionally, or alternatively, one or more operations described above with reference to FIGS. 1-2 may be combined with one or more operations described with reference to FIGS. 3-8.

In one or more aspects, techniques for supporting image capture and/or image processing may include additional aspects, such as any single aspect or any combination of aspects described below or in connection with one or more other processes or devices described elsewhere herein. In a first aspect, supporting image capture and/or image processing may include an apparatus configured to receiving an input image frame representing a scene at a first resolution, wherein the input image frame comprises first image data and second image data, the first image data corresponding to a first exposure different from a second exposure of the second image data; determining a first image frame from the first image data and the second image data by adjusting the second image data based on a difference between the first exposure and the second exposure, wherein the first image frame has a same resolution as the first resolution; determining a second image frame from the second image data, wherein the second image frame has a same resolution as the first resolution; and determining an output image frame based on the first image frame and the second image frame. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, adjusting the second image data comprises compensating the second image data to obtain compensated second image data such that pixel values of the first image data and pixel values of the compensated second image data correspond to equivalent exposures, and determining the first image frame further comprises: determining a first intermediate frame from the first image data and the compensated second image data, wherein the first image frame is based on the first intermediate frame.

In a third aspect, in combination with one or more of the first aspect or the second aspect, determining the second image frame comprises: determining a second intermediate frame by binning the second image data to obtain a representation of the scene at a second resolution lower than the first resolution; and upscaling the second intermediate frame to the first resolution to determine the second image frame.

In a fourth aspect, in combination with one or more of the first aspect through the third aspect, the output image frame comprises a higher dynamic range representation of the scene than either the first image data or the second image data.

In a fifth aspect, in combination with one or more of the first aspect through the fourth aspect, the apparatus is configured to perform further operations including determining to capture a high dynamic range (HDR) representation of the scene with in-sensor zoom, wherein determining the output image frame is based on determining to capture the high dynamic range (HDR) representation of the scene with in-sensor zoom.

In a sixth aspect, in combination with one or more of the first aspect through the fifth aspect, the input image frame further comprises third image data, the third image data corresponding to a third exposure different from the first exposure and the second exposure; determining the first image frame is further based on the third image data by adjusting the third image data based on a difference between the third exposure and the first exposure; and the apparatus is further configured to perform operations including determining a third image frame from the third image data, wherein the third image frame has a same resolution as the first resolution; and the output image frame is further based on the third image frame.

In a seventh aspect, in combination with one or more of the first aspect through the sixth aspect, the input image frame comprises a quarter color filter array (QCFA) representation of the scene; wherein determining the first image frame comprises: determining an exposure-compensated QCFA representation of the scene based on the adjusting the second image data based on a difference between the first exposure and the second exposure, remosaicing the exposure-compensated QCFA representation of the scene to a Bayer representation of the scene, and demosaicing the Bayer representation of the scene to a RGB representation of the scene as the first image frame; and wherein determining the second image frame comprises: determining a quarter-resolution Bayer representation of the scene based on the second image data; demosaicing the quarter-resolution Bayer representation of the scene to a quarter-resolution RGB representation of the scene; and upscaling the quarter-resolution RGB representation of the scene to a higher-resolution RGB representation of the scene as the second image frame.

In an eighth aspect, in combination with one or more of the first aspect through the seventh aspect, the input image frame comprises a 4×4 color filter array (CFA) representation of the scene; wherein determining the first image frame comprises: determining an exposure-compensated 4×4 CFA representation of the scene based on the adjusting the second image data based on a difference between the first exposure and the second exposure; remosaicing the exposure-compensated 4×4 CFA representation of the scene to a Bayer representation of the scene; and demosaicing the Bayer representation of the scene to a RGB representation of the scene as the first image frame; and wherein determining the second image frame comprises: determining a quarter-resolution QCFA representation of the scene based on the second image data; demosaicing the quarter-resolution QCFA representation of the scene to a quarter-resolution RGB representation of the scene; and upscaling the quarter-resolution RGB representation of the scene to a higher-resolution RGB representation of the scene as the second image frame.

In a ninth aspect, in combination with one or more of the first aspect through the eighth aspect, the input image frame comprises a 4×4 color filter array (CFA) representation of the scene; wherein determining the first image frame comprises: determining an exposure-compensated 4×4 CFA representation of the scene based on the adjusting the second image data based on a difference between the first exposure and the second exposure; remosaicing the exposure-compensated 4×4 CFA representation of the scene to a Bayer representation of the scene; and demosaicing the Bayer representation of the scene to a RGB representation of the scene as the first image frame; and wherein determining the second image frame comprises: determining a sixteenth-resolution QCFA representation of the scene based on the second image data; demosaicing the sixteenth-resolution QCFA representation of the scene to a sixteenth-resolution RGB representation of the scene; and upscaling the sixteenth-resolution RGB representation of the scene to a higher-resolution RGB representation of the scene as the second image frame.

In a tenth aspect, in combination with one or more of the first aspect through the ninth aspect, the input image frame comprises a 3×3 color filter array (CFA) representation of the scene; wherein determining the first image frame comprises: determining an exposure-compensated 3×3 CFA representation of the scene based on the adjusting the second image data based on a difference between the first exposure and the second exposure; remosaicing the exposure-compensated 3×3 CFA representation of the scene to a Bayer representation of the scene; and demosaicing the Bayer representation of the scene to a RGB representation of the scene as the first image frame; and wherein determining the second image frame comprises: determining a ninth-resolution Bayer representation of the scene based on the second image data; demosaicing the ninth-resolution Bayer representation of the scene to a ninth-resolution RGB representation of the scene; and upscaling the ninth-resolution RGB representation of the scene to a higher-resolution RGB representation of the scene as the second image frame.

In an eleventh aspect, in combination with one or more of the first aspect through the tenth aspect, the input image frame comprises a RGBW representation of the scene; wherein determining the first image frame comprises: determining an exposure-compensated quarter color filter array (CFA) representation of the scene based on the adjusting the second image data based on a difference between the first exposure and the second exposure; remosaicing the exposure-compensated QCFA representation of the scene to a Bayer representation of the scene; and demosaicing the Bayer representation of the scene to a RGB representation of the scene as the first image frame; and wherein determining the second image frame comprises: determining a quarter-resolution Bayer representation of the scene based on the second image data; demosaicing the quarter-resolution Bayer representation of the scene to a quarter-resolution RGB representation of the scene; and upscaling the quarter-resolution RGB representation of the scene to a higher-resolution RGB representation of the scene as the second image frame.

In a twelfth aspect, in combination with one or more of the first aspect through the eleventh aspect, the apparatus further includes an image sensor coupled to the processor.

In a thirteenth aspect, in combination with one or more of the first aspect through the twelfth aspect, the processor is configured to receive the input image frame from the image sensor, and the image sensor comprises a pixel-interleaved image sensor.

In one or more aspects, techniques for supporting image capture and/or image processing may include additional aspects, such as any single aspect or any combination of aspects described below or in connection with one or more other processes or devices described elsewhere herein. In a fourteenth aspect, supporting image capture and/or image processing may include an apparatus including an image sensor, a memory storing processor-readable code, and at least one processor coupled to the memory and to the image sensor, the at least one processor configured to execute the processor-readable code.

In a fifteenth aspect, in combination with one or more of the first aspect through the fourteenth aspect, the at least one processor is configured to perform operations including receiving an input image frame representing a scene at a first resolution, wherein the input image frame comprises first image data and second image data, the first image data corresponding to a first exposure time longer than a second exposure time of the second image data; determining a first image frame from the first image data and the second image data; determining a second image frame from the second image data, wherein the second image frame has a same resolution as the first resolution; and determining an output image frame based on the first image frame and the second image frame.

In a sixteenth aspect, in combination with one or more of the first aspect through the fifteenth aspect, determining the first image frame comprises performing operations including: determining compensated second image data by adjusting the second image data based on the first exposure time and the second exposure time; forming a full-resolution long-exposure image frame in a first color pattern arrangement based on the first image data and the compensated second image data; and converting the full-resolution long-exposure image frame from a first color pattern arrangement to a second color pattern arrangement to determine the first image frame.

In a seventeenth aspect, in combination with one or more of the first aspect through the sixteenth aspect, determining the second image frame comprises performing operations including: forming a lower-resolution short-exposure image frame in a third color pattern arrangement based on the second image data; converting the lower-resolution short-exposure image frame from the third color pattern to the second color pattern arrangement; and upscaling the lower-resolution short-exposure image frame to a full-resolution short-exposure image frame, wherein the second image frame is the full-resolution short-exposure image frame.

In an eighteenth aspect, in combination with one or more of the first aspect through the seventeenth aspect, the apparatus is configured to perform further operations including determining to capture a high dynamic range (HDR) representation of the scene with in-sensor zoom, wherein determining the output image frame is based on determining to capture the high dynamic range (HDR) representation of the scene with in-sensor zoom.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving an input image frame that is formed of a plurality of pixels at different respective coordinates combined as a single representation of a scene, each one of the pixels representing a different respective one of a plurality of points of the scene than each other one of the pixels, wherein:
      the input image frame is at a first resolution;
      a first subset of the pixels of the input image frame provides first image data at a first exposure; and
      a second subset of the pixels of the input image frame provides second image data at a second exposure that is different than the first exposure;
   determining a first image frame from the first image data and the second image data by adjusting the second image data based on a difference between the first exposure and the second exposure, wherein the first image frame has a same resolution as the first resolution;
   determining a second image frame from the second image data, wherein the second image frame has a same resolution as the first resolution; and
   determining an output image frame based on the first image frame and the second image frame.

2. The method of claim 1, wherein adjusting the second image data comprises compensating the second image data to obtain compensated second image data such that pixel values of the first image data and pixel values of the compensated second image data correspond to equivalent exposures, and wherein determining the first image frame further comprises:

determining a first intermediate frame from the first image data and the compensated second image data, wherein the first image frame is based on the first intermediate frame.

3. The method of claim 2, wherein determining the second image frame comprises:
  determining a second intermediate frame by binning the second image data to obtain a representation of the scene at a second resolution lower than the first resolution; and
  upscaling the second intermediate frame to the first resolution to determine the second image frame.

4. The method of claim 1, wherein the output image frame comprises a higher dynamic range representation of the scene than either the first image data or the second image data.

5. The method of claim 1, further comprising:
  determining to capture a high dynamic range (HDR) representation of the scene with in-sensor zoom,
  wherein determining the output image frame is based on determining to capture the high dynamic range (HDR) representation of the scene with in-sensor zoom.

6. The method of claim 1, wherein:
  the input image frame further comprises third image data, the third image data corresponding to a third exposure different from the first exposure and the second exposure;
  determining the first image frame is further based on the third image data by adjusting the third image data based on a difference between the third exposure and the first exposure;
  the method further comprises determining a third image frame from the third image data, wherein the third image frame has a same resolution as the first resolution; and
  the output image frame is further based on the third image frame.

7. The method of claim 1, wherein:
  the input image frame comprises a quarter color filter array (QCFA) representation of the scene;
  determining the first image frame comprises:
    determining an exposure-compensated QCFA representation of the scene based on the adjusting the second image data based on a difference between the first exposure and the second exposure,
    remosaicing the exposure-compensated QCFA representation of the scene to a Bayer representation of the scene, and
    demosaicing the Bayer representation of the scene to a RGB representation of the scene as the first image frame; and
  determining the second image frame comprises:
    determining a quarter-resolution Bayer representation of the scene based on the second image data;
    demosaicing the quarter-resolution Bayer representation of the scene to a quarter-resolution RGB representation of the scene; and
    upscaling the quarter-resolution RGB representation of the scene to a higher-resolution RGB representation of the scene as the second image frame.

8. The method of claim 1, wherein:
  the input image frame comprises a 4×4 color filter array (CFA) representation of the scene;
  determining the first image frame comprises:
    determining an exposure-compensated 4×4 CFA representation of the scene based on the adjusting the second image data based on a difference between the first exposure and the second exposure;
    remosaicing the exposure-compensated 4×4 CFA representation of the scene to a Bayer representation of the scene; and
    demosaicing the Bayer representation of the scene to a RGB representation of the scene as the first image frame; and
  determining the second image frame comprises:
    determining a quarter-resolution QCFA representation of the scene based on the second image data;
    demosaicing the quarter-resolution QCFA representation of the scene to a quarter-resolution RGB representation of the scene; and
    upscaling the quarter-resolution RGB representation of the scene to a higher-resolution RGB representation of the scene as the second image frame.

9. The method of claim 1, wherein:
  the input image frame comprises a 4×4 color filter array (CFA) representation of the scene;
  determining the first image frame comprises:
    determining an exposure-compensated 4×4 CFA representation of the scene based on the adjusting the second image data based on a difference between the first exposure and the second exposure;
    remosaicing the exposure-compensated 4×4 CFA representation of the scene to a Bayer representation of the scene; and
    demosaicing the Bayer representation of the scene to a RGB representation of the scene as the first image frame; and
  determining the second image frame comprises:
    determining a sixteenth-resolution QCFA representation of the scene based on the second image data;
    demosaicing the sixteenth-resolution QCFA representation of the scene to a sixteenth-resolution RGB representation of the scene; and
    upscaling the sixteenth-resolution RGB representation of the scene to a higher-resolution RGB representation of the scene as the second image frame.

10. The method of claim 1, wherein:
  the input image frame comprises a 3×3 color filter array (CFA) representation of the scene;
  determining the first image frame comprises:
    determining an exposure-compensated 3×3 CFA representation of the scene based on the adjusting the second image data based on a difference between the first exposure and the second exposure;
    remosaicing the exposure-compensated 3×3 CFA representation of the scene to a Bayer representation of the scene; and
    demosaicing the Bayer representation of the scene to a RGB representation of the scene as the first image frame; and
  determining the second image frame comprises:
    determining a ninth-resolution Bayer representation of the scene based on the second image data;
    demosaicing the ninth-resolution Bayer representation of the scene to a ninth-resolution RGB representation of the scene; and
    upscaling the ninth-resolution RGB representation of the scene to a higher-resolution RGB representation of the scene as the second image frame.

11. The method of claim 1, wherein:
  the input image frame comprises a RGBW representation of the scene;
  determining the first image frame comprises:

determining an exposure-compensated quarter color filter array (CFA) representation of the scene based on the adjusting the second image data based on a difference between the first exposure and the second exposure;

remosaicing the exposure-compensated QCFA representation of the scene to a Bayer representation of the scene; and demosaicing the Bayer representation of the scene to a RGB representation of the scene as the first image frame; and determining the second image frame comprises:
determining a quarter-resolution Bayer representation of the scene based on the second image data;
demosaicing the quarter-resolution Bayer representation of the scene to a quarter-resolution RGB representation of the scene; and
upscaling the quarter-resolution RGB representation of the scene to a higher-resolution RGB representation of the scene as the second image frame.

12. An apparatus, comprising:
a memory storing processor-readable code; and
at least one processor coupled to the memory, the at least one processor configured to execute the processor-readable code to cause the at least one processor to perform operations including:
receiving an input image frame that is formed of a plurality of pixels at different respective coordinates combined as a single representation of a scene, each one of the pixels representing a different respective one of a plurality of points of the scene than each other one of the pixels, wherein:
the input image frame is at a first resolution;
a first subset of the pixels of the input image frame provides first image data at a first exposure; and
a second subset of the pixels of the input image frame provides second image data at a second exposure that is different than the first exposure;
determining a first image frame from the first image data and the second image data by adjusting the second image data based on a difference between the first exposure and the second exposure, wherein the first image frame has a same resolution as the first resolution;
determining a second image frame from the second image data, wherein the second image frame has a same resolution as the first resolution; and
determining an output image frame based on the first image frame and the second image frame.

13. The apparatus of claim 12, wherein adjusting the second image data comprises compensating the second image data to obtain compensated second image data such that pixel values of the first image data and pixel values of the compensated second image data correspond to equivalent exposures, and wherein determining the first image frame further comprises:
determining a first intermediate frame from the first image data and the compensated second image data, wherein the first image frame is based on the first intermediate frame.

14. The apparatus of claim 13, wherein determining the second image frame comprises:
determining a second intermediate frame by binning the second image data to obtain a representation of the scene at a second resolution lower than the first resolution; and upscaling the second intermediate frame to the first resolution to determine the second image frame.

15. The apparatus of claim 12, wherein the output image frame comprises a higher dynamic range representation of the scene than either the first image data or the second image data.

16. The apparatus of claim 12, wherein the at least one processor is further configured to execute the processor-readable code to cause the at least one processor to:
determining to capture a high dynamic range (HDR) representation of the scene with in-sensor zoom,
wherein determining the output image frame is based on determining to capture the high dynamic range (HDR) representation of the scene with in-sensor zoom.

17. The apparatus of claim 12, wherein:
the input image frame further comprises third image data, the third image data corresponding to a third exposure different from the first exposure and the second exposure;
determining the first image frame is further based on the third image data by adjusting the third image data based on a difference between the third exposure and the first exposure;
the operations further including determining a third image frame from the third image data, wherein the third image frame has a same resolution as the first resolution; and
the output image frame is further based on the third image frame.

18. The apparatus of claim 12, further comprising an image sensor coupled to the processor, wherein the processor is configured to receive the input image frame from the image sensor, and wherein the image sensor comprises a pixel-interleaved image sensor.

19. The apparatus of claim 12, wherein:
the input image frame comprises a quarter color filter array (QCFA) representation of the scene;
determining the first image frame comprises:
determining an exposure-compensated QCFA representation of the scene based on the adjusting the second image data based on a difference between the first exposure and the second exposure,
remosaicing the exposure-compensated QCFA representation of the scene to a Bayer representation of the scene, and
demosaicing the Bayer representation of the scene to a RGB representation of the scene as the first image frame; and
determining the second image frame comprises:
determining a quarter-resolution Bayer representation of the scene based on the second image data;
demosaicing the quarter-resolution Bayer representation of the scene to a quarter-resolution RGB representation of the scene; and
upscaling the quarter-resolution RGB representation of the scene to a higher-resolution RGB representation of the scene as the second image frame.

20. The apparatus of claim 12, wherein:
the input image frame comprises a 4×4 color filter array (CFA) representation of the scene;
determining the first image frame comprises:
determining an exposure-compensated 4×4 CFA representation of the scene based on the adjusting the second image data based on a difference between the first exposure and the second exposure;

remosaicing the exposure-compensated 4×4 CFA representation of the scene to a Bayer representation of the scene; and
demosaicing the Bayer representation of the scene to a RGB representation of the scene as the first image frame; and
determining the second image frame comprises:
determining a quarter-resolution QCFA representation of the scene based on the second image data;
demosaicing the quarter-resolution QCFA representation of the scene to a quarter-resolution RGB representation of the scene; and
upscaling the quarter-resolution RGB representation of the scene to a higher-resolution RGB representation of the scene as the second image frame.

21. The apparatus of claim 12, wherein:
the input image frame comprises a 4×4 color filter array (CFA) representation of the scene;
determining the first image frame comprises:
determining an exposure-compensated 4×4 CFA representation of the scene based on the adjusting the second image data based on a difference between the first exposure and the second exposure;
remosaicing the exposure-compensated 4×4 CFA representation of the scene to a Bayer representation of the scene; and
demosaicing the Bayer representation of the scene to a RGB representation of the scene as the first image frame; and
determining the second image frame comprises:
determining a sixteenth-resolution QCFA representation of the scene based on the second image data;
demosaicing the sixteenth-resolution QCFA representation of the scene to a sixteenth-resolution RGB representation of the scene; and
upscaling the sixteenth-resolution RGB representation of the scene to a higher-resolution RGB representation of the scene as the second image frame.

22. The apparatus of claim 12, wherein:
the input image frame comprises a 3×3 color filter array (CFA) representation of the scene;
determining the first image frame comprises:
determining an exposure-compensated 3×3 CFA representation of the scene based on the adjusting the second image data based on a difference between the first exposure and the second exposure;
remosaicing the exposure-compensated 3×3 CFA representation of the scene to a Bayer representation of the scene; and
demosaicing the Bayer representation of the scene to a RGB representation of the scene as the first image frame; and
determining the second image frame comprises:
determining a ninth-resolution Bayer representation of the scene based on the second image data;
demosaicing the ninth-resolution Bayer representation of the scene to a ninth-resolution RGB representation of the scene; and
upscaling the ninth-resolution RGB representation of the scene to a higher-resolution RGB representation of the scene as the second image frame.

23. The apparatus of claim 12, wherein:
the input image frame comprises a RGBW representation of the scene;
determining the first image frame comprises:
determining an exposure-compensated quarter color filter array (CFA) representation of the scene based on the adjusting the second image data based on a difference between the first exposure and the second exposure;
remosaicing the exposure-compensated QCFA representation of the scene to a Bayer representation of the scene; and
demosaicing the Bayer representation of the scene to a RGB representation of the scene as the first image frame; and
determining the second image frame comprises:
determining a quarter-resolution Bayer representation of the scene based on the second image data;
demosaicing the quarter-resolution Bayer representation of the scene to a quarter-resolution RGB representation of the scene; and
upscaling the quarter-resolution RGB representation of the scene to a higher-resolution RGB representation of the scene as the second image frame.

24. A non-transitory computer-readable medium storing instructions that, when executed by a processor, cause the processor to perform operations comprising:
receiving an input image frame that is formed of a plurality of pixels at different respective coordinates combined as a single representation of a scene, each one of the pixels representing a different respective one of a plurality of points of the scene than each other one of the pixels, wherein:
the input image frame is at a first resolution;
a first subset of the pixels of the input image frame provides first image data at a first exposure; and
a second subset of the pixels of the input image frame provides second image data at a second exposure that is different than the first exposure;
determining a first image frame from the first image data and the second image data by adjusting the second image data based on a difference between the first exposure and the second exposure, wherein the first image frame has a same resolution as the first resolution;
determining a second image frame from the second image data, wherein the second image frame has a same resolution as the first resolution; and
determining an output image frame based on the first image frame and the second image frame.

25. The non-transitory, computer-readable medium of claim 24, wherein adjusting the second image data comprises compensating the second image data to obtain compensated second image data such that pixel values of the first image data and pixel values of the compensated second image data correspond to equivalent exposures, and wherein determining the first image frame further comprises:
determining a first intermediate frame from the first image data and the compensated second image data, wherein the first image frame is based on the first intermediate frame.

26. The non-transitory, computer-readable medium of claim 24, wherein determining the second image frame comprises:
determining a second intermediate frame by binning the second image data to obtain a representation of the scene at a second resolution lower than the first resolution; and
upscaling the second intermediate frame to the first resolution to determine the second image frame.

27. An apparatus, comprising:
an image sensor;
a memory storing processor-readable code; and at least one processor coupled to the memory and to the image sensor, the at least one processor configured to execute the processor-readable code to cause the at least one processor to:

receiving an input image frame representing a scene at a first resolution, wherein the input image frame comprises first image data and second image data, the first image data corresponding to a first exposure time longer than a second exposure time of the second image data;

determining a first image frame from the first image data and the second image data, wherein the first image frame has a same resolution as the first resolution, wherein determining the first image frame comprises performing operations including:

determining compensated second image data by adjusting the second image data based on the first exposure time and the second exposure time;

forming a full-resolution long-exposure image frame in a first color pattern arrangement based on the first image data and the compensated second image data; and converting the full-resolution long-exposure image frame from the first color pattern arrangement to a second color pattern arrangement to determine the first image frame;

determining a second image frame from the second image data, wherein the second image frame has a same resolution as the first resolution, wherein determining the second image frame comprises performing operations including:

forming a lower-resolution short-exposure image frame in a third color pattern arrangement based on the second image data;

converting the lower-resolution short-exposure image frame from the third color pattern arrangement to the second color pattern arrangement; and upscaling the lower-resolution short-exposure image frame to a full-resolution short-exposure image frame, wherein the second image frame is the full-resolution short-exposure image frame; and determining an output image frame based on the first image frame and the second image frame.

28. The apparatus of claim 27, wherein the output image frame comprises a higher dynamic range representation of the scene than either the first image data or the second image data.

29. The apparatus of claim 27, wherein the image sensor comprises a pixel-interleaved image sensor.

30. The apparatus of claim 27, wherein the at least one processor is further configured to execute the processor-readable code to cause the at least one processor to:

determining to capture a high dynamic range (HDR) representation of the scene with in-sensor zoom, wherein determining the output image frame is based on determining to capture the high dynamic range (HDR) representation of the scene with in-sensor zoom.

* * * * *